L. COHEN.
METHOD AND APPARATUS FOR DUPLEX CABLE SIGNALING.
APPLICATION FILED MAY 27, 1919.

1,371,471.

Patented Mar. 15, 1921.
2 SHEETS—SHEET 1.

INVENTOR.
Louis Cohen
BY
his ATTORNEYS.

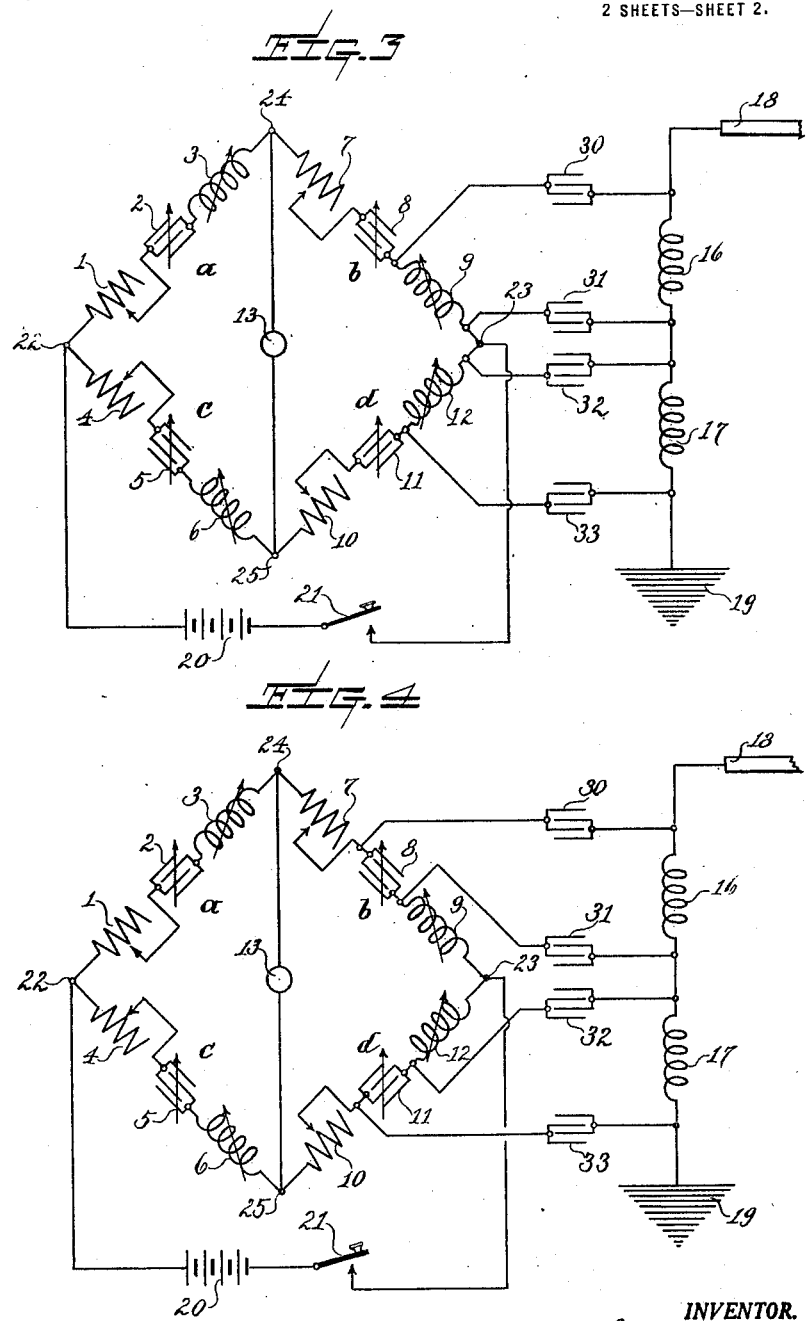

UNITED STATES PATENT OFFICE.

LOUIS COHEN, OF WASHINGTON, DISTRICT OF COLUMBIA.

METHOD AND APPARATUS FOR DUPLEX CABLE-SIGNALING.

1,371,471.  Specification of Letters Patent.  Patented Mar. 15, 1921.

Application filed May 27, 1919. Serial No. 300,052.

*To all whom it may concern:*

Be it known that I, LOUIS COHEN, a citizen of the United States, and residing in the city of Washington and District of Columbia, have invented certain new and useful Improvements in Methods and Apparatus for Duplex Cable-Signaling, of which the following is a full description.

My invention is illustrated in the accompanying drawings and its particular novel features are pointed out in the annexed claims.

The object of this invention is an improvement in the art of signaling, and refers particularly to duplex signaling over land lines or cables.

In the present practice, duplexing is accomplished by a Wheatstone bridge arrangement in which the cable constitutes one arm of the bridge, and an artificial balancing cable constitutes another arm of the bridge. To obtain a perfect bridge balance, the ideal condition desired, the artificial cable must have exactly the same electrical characteristics in every respect as the cable itself, a condition which at best can only be approximated and which requires very expensive devices.

The principal object of my invention is, to do away entirely with the artificial cable and to balance the cable or line against itself. To obtain this effect, a closed Wheatstone bridge arrangement is employed, the four arms of which consist of appropriate inductances, resistances and capacities, and the cable is coupled with two arms of the bridge; the degrees of coupling may be the same or different for the two arms. The coupling may be either electro-magnetic, electrostatic or direct, but in any case the couplings are so arranged that the local transmitting current is balanced out in the bridge and does not affect the indicating instrument which is located in the bridging arm of the bridge, while the current of the received signal affects the arms of the bridge in such a manner as to send a current flow through the bridging arm and the indicating instrument. The method of accomplishing the above results will be more clearly understood by refernce to the accompanying wiring diagrams, in which—

Figs. 3 and 4 show an electrostatic coupling.

The same general principle is utilized in the various circuit arrangements shown in the figures, except that different types of coupling are employed, as will appear from the further description.

Figure 1:
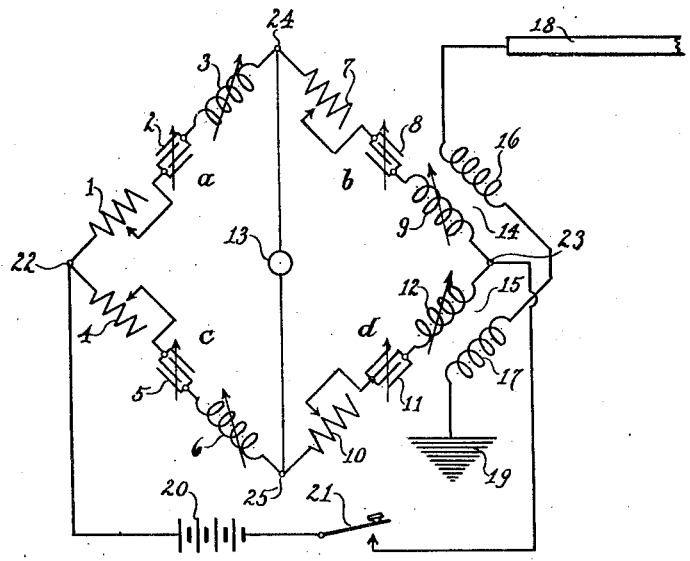
Figure 1 shows an inductive coupling.

In Fig. 1, $a$, $b$, $c$ and $d$ are the four arms of a Wheatstone bridge; arm $a$ consists of resistance 1, capacity 2 and inductance 3; arm $b$ consists of resistance 7, capacity 8 and inductance 9; arm $c$ consists of resistance 4, capacity 5 and inductance 6; arm $d$ consists of resistance 10, capacity 11 and inductance 12. Each of these constants in the four arms is variable as shown. The receiving or indicating instrument 13 is connected in the bridging arm 24, 13, 25. The source 20 of the sending electromotive force is connected in series with the sending key 21 and connected to the junction points 22 and 23 of the two parallel main branches of the bridge. The cable or line 18 is connected over the inductances 16 and 17 to ground 19. The two inductance coils 16 and 17, which are in series with the cable, constitute the secondaries of transformers 14 and 15, of which 9 and 12 are the respective primaries, and through these transformers the cable is linked electromagnetically with the two arms $b$ and $d$ of the bridge.

The operation is as follows: In closing the key 21 for signaling, a current flow is set up in the circuit which divides at the points 22, 23, part flowing through one main branch of the bridge comprising arms $a$ and $b$, and part flowing through the other main branch comprising arms $c$ and $d$. Now, obviously the currents within the bridge arm pairs $a$, $c$ and $b$, $d$ are oppositely directed, hence the currents induced in the cable circuit 18, 16, 17, 19 through the transformers 14 and 15 are also oppositely directed. If, however, the electrical constants of the bridge arms are fixed so that, while maintaining a balance in bridging arm 24, 13, 25, the current in the main branch, comprising arms $a$ and $b$ is several times larger than the current in the main branch comprising arms $c$ and $d$, then obviously the electromotive force induced in the cable circuit 18, 16, 17, 19 through transformer 14 is several times larger than the electromotive force induced through transformer 15, and the difference of the two electromotive forces serves as the source of electromotive force for sending the signal current through the cable to the other terminal. This condition can be readily realized, because for a bridge balance we must have the following relation between the impedances of the bridge arms;

$$\frac{\text{Impedance } a}{\text{Impedance } c} = \frac{\text{Impedance } b}{\text{Impedance } d}$$

We can make the impedances of the arms $c$ and $d$ large in comparison with the impedances of the arms $a$ and $b$, but still in such a ratio as to satisfy above relation and thus maintain the bridge balance, but we may make thus the current division at points 22 and 23 uneven, so that a much larger current flows through arms $a$, $b$ than through arms $c$, $d$. By this expedient electromotive forces of different magnitudes are induced in the cable circuit by transformers 16 and 17, whose difference constitutes the sending electromotive force.

The current from the received signal however will induce electromotive forces in the secondaries 9 and 12 of transformers 14 and 15 in the same direction and their effects will be additive in generating a current in the circuit 24, 13, 25, 10, 11, 12, 23, 9, 8, 7, 24, thus affecting the indicating instrument 13.

It is to be observed that in this arrangement the cable or line forms part of two arms of the bridge by virtue of the transformer connections 14 and 15, and hence the cable is balanced against itself so that the difficulty of balancing a circuit of distributed capacity and resistance by means of artificial cables or the like, employed heretofore, is completely eliminated. It is preferable but not essential to make the transformers 14 and 15 similar. Satisfactory operation may also be obtained when the ratio of transformation or the mutual inductances of the two transformers are different; it is only necessary to adjust for a balance in the bridging arm, and so adjust the electrical constants that the electromotive forces induced in the cable circuit through the two transformers 14 and 15 for sending purposes are of different magnitudes.

Figure 2:
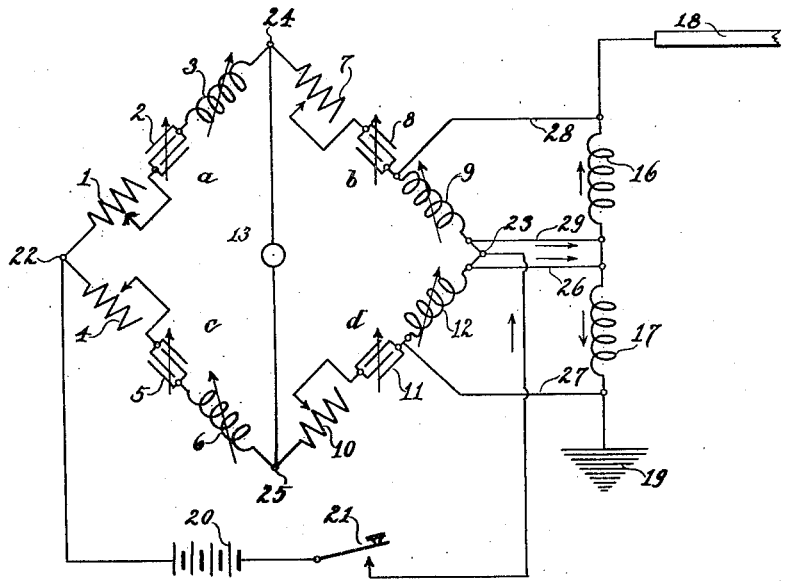
Fig. 2 shows a direct conductive coupling.

Figs. 2, 3 and 4 are modifications of Fig. 1. The same principle and arrangement of circuits is employed in either case, the only difference being in the type of coupling employed. In Fig. 2 a direct coupling is shown. The coils 16 and 17 of the cable circuits are connected to coils 9 and 12 of arms $b$ and $d$ by means of the leads 28, 29 and 26, 27, respectively. The current entering at the point 23 divides, part flowing through 9 and 16, and part flowing through 12 and 17, as indicated by the arrows. The currents in coils 16 and 17 are oppositely directed, but of different magnitudes, and the difference is utilized for transmitting signals through the cable the same as described before. The current of the incoming signal flows in the same direction in coils 9 and 12, and the effect is additive on the indicating instrument 13, which is located in the circuit 24, 7, 8, 9, 23, 12, 11, 10, 25, 13.

Fig. 3 shows another modification, in which the coils 16 and 17 of the cable circuit are connected through condensers 30, 31 and 32, 33 to coils 9 and 12, respectively, of the bridge arms $b$ and $d$.

In Fig. 4 a modification is shown, in which the coils 16 and 17 of the cable circuit are connected through condensers 30, 31 and 32, 33 respectively, to the condensers 8 and 11 of the bridge arms $b$ and $d$.

In all the figures only one terminal of the telegraph system is shown, it being understood, of course, that an exact duplicate of the circuit equipment is provided for each end of telegraph line or cable.

I claim:

1. In a duplex telegraph arrangement in combination with the telegraph line, a grounding branch for said line, a Wheatstone bridge having a bridging arm and four arms forming the two main branches of the bridge, and a source of current connected to the junction points of said main branches, the grounding branch of said line being coupled with two arms of the bridge located adjacent to one of said junction points, the four arms of said bridge being suitably adjusted to balance the current from said source in the bridging arm.

2. In a duplex telegraph arrangement in combination with the telegraph line, a grounding branch for said line, a Wheatstone bridge having a bridging arm and four arms forming the two main branches of the bridge and a source of current connected to the junction points of said main branches, the grounding branch of said line being coupled with two arms of the bridge located adjacent to one of said junction points, the four arms of said bridge being suitably adjusted to balance the current from said source in the bridging arm, the distribution of current in said arms being suitably chosen to permit more current from said source to flow in one of said coupled arms than in the other coupled arm, to cause a current flow in the line proportional to the difference of the currents flowing in said two coupled arms.

3. In a duplex telegraph arrangement in combination with the telegraph line, a grounding branch for said line, a Wheatstone bridge having a bridging arm and four arms forming the two main branches of the bridge, and a source of current connected to the junction points of said main branches, the grounding branch of said line being coupled with two arms of the bridge located adjacent to one of said junction points, the four arms of said bridge being suitably adjusted to balance the current from said source in the bridging arm, the received signal current flowing through said grounding branch causing the addition of its effects in said coupled bridge arms and causing a current flow in said bridging arm.

4. In a duplex telegraph arrangement in combination with the telegraph line, a grounding branch for said line, a Wheatstone bridge having a bridging arm and four arms forming the two main branches of the bridge and a source of current connected to the junction points of said main branches, the grounding branch of said line being coupled with two arms of the bridge located adjacent to one of said junction points, the four arms of said bridge being suitably adjusted to balance the current from said source in the bridging arm, the distribution of current in said arm being suitably chosen to permit more current from said source to flow in one of said coupled arms than in the other coupled arm, to cause a sending current flow in the line proportional to the difference of the currents flowing in said two coupled arms, the received signal current flowing through said grounding branch causing the addition of its effects in said coupled bridge arms and causing a current flow in said bridging arm.

5. In a duplex telegraph arrangement in combination with the telegraph line, a grounding branch for said line, a Wheatstone bridge, having a bridging arm and four arms forming the two main branches of the bridge, inductances, capacities and resistances in said four arms, and a source of current connected to the junction points of said main branches, the grounding branch of said line being inductively coupled with two arms of the bridge located adjacent to one of said junction points, said inductances, capacities and resistances of said four arms being suitably adjusted to balance the current from said source in the bridging arm, the distribution of current in said arms being suitably chosen to permit more current from said source to flow in one of said coupled arms than in the other coupled arm to cause a sending current flow in the line equal to the difference of the currents flowing in said two coupled arms.

6. In a duplex telegraph arrangement in combination with the telegraph line, a grounding branch for said line, a Wheatstone bridge, having a bridging arm and four arms forming the two main branches of the bridge, inductances, capacities and resistances in said four arms and a source of current connected to the junction points of said main branches, the grounding branch of said line being inductively coupled with two arms of the bridge located adjacent to one of said junction points, said inductances, capacities and resistances of said four arms being suitably adjusted to balance the current from said source in the bridging arm, the distribution of current in said arms being suitably chosen to permit more current from said source to flow in one of said coupled arms than in the other coupled arm to cause a sending current flow in the line proportional to the difference of the currents flowing in said two coupled arms, the received signal current flowing through said grounding branch causing the addition of its effects in said coupled bridge arms and causing the unbalancing of the bridge in said bridging arm.

7. In a duplex telegraph arrangement in combination with the telegraph line, a grounding branch for said line, a Wheatstone bridge, having a bridging arm and four arms forming the two main branches of the bridge, inductances, capacities and resistances in said four arms and a source of current connected to the junction points of said main branches, the grounding branch of said line being inductively coupled with two arms of the bridge located adjacent to one of said junction points, said inductances, capacities and resistances of said four arms being suitably adjusted to balance the current from said source in the bridging arm, the couplings to the two arms being so adjusted as to permit more current from said source to flow in one of said coupled arms than in the other coupled arm to cause a sending current flow in the line proportional to the difference of the currents flowing in said two coupled arms, the received signal current flowing through said grounding branch causing the addition of its effects in said coupled bridge arms and causing a current flow in said bridging arm.

8. In a duplex telegraph arrangement in combination with the telegraph line, a grounding branch for said line, a Wheatstone bridge, having a bridging arm and four arms forming the two main branches of the bridge, inductances, capacities and resistances in said four arms and a source of current connected to the junction points of said main branches, the grounding branch of said line being directly coupled with the two arms of the bridge located adjacent to one of said junction points, said inductances, capacities and resistances of said four arms being suitably adjusted to balance the current from said source in the bridging arm, the distribution of current in said arms being suitably chosen to permit more current from said source to flow in one of said coupled arms than in the other coupled arm to cause a sending current flow in the line proportional to the difference of the currents flowing in said two coupled arms, the received signal current flowing through said grounding branch causing the addition of its effects in said coupled bridge arms and causing a current flow in said bridging arm.

9. In a duplex telegraph arrangement in combination with the telegraph line, a grounding branch for said line, a Wheatstone bridge, having a bridging arm and four arms forming the two main branches of the bridge, inductances, capacities and resistances in said four arms and a source of current connected to the junction points of said main branches, the grounding branch of said line being electrostatically coupled with two arms of the bridge located adjacent to one of said junction points, said inductances, capacities and resistances of said four arms being suitably adjusted to balance the current from said source in the bridging arm, the distribution of current in said arms being suitably chosen to permit more current from said source to flow in one of said coupled arms than in the other coupled arm to cause a sending current flow in the line proportional to the difference of the currents flowing in said two coupled arms, the received signal current flowing through said grounding branch causing the addition of its effects in said coupled bridge arms and causing a current flow in said bridging arm.

LOUIS COHEN.